Feb. 10, 1970  R. C. WOODS ET AL  3,494,009
CONCRETE PIPE SEAL GROOVE FORMING MECHANISM
Original Filed June 17, 1964  2 Sheets-Sheet 1
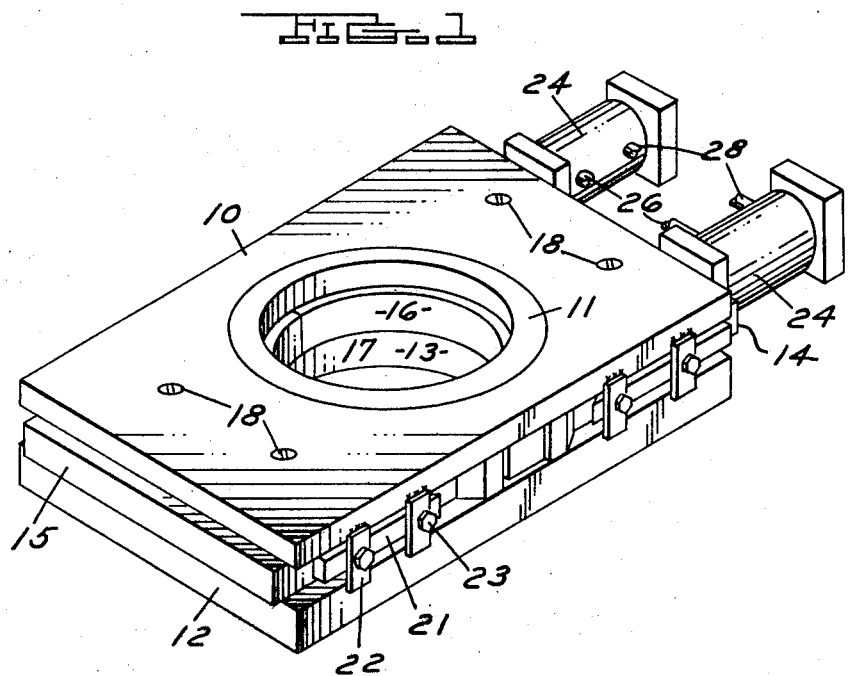
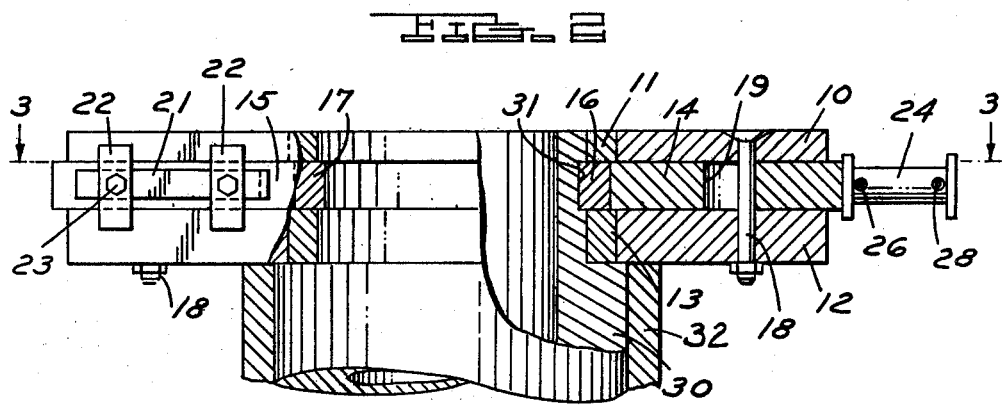
INVENTORS
RANDELL C. WOODS
THOMAS J. ENGLE
DANIEL J. CONLEY
RONALD P. KIRCHNER
HOWARD T. REX
BY *Harley, Forsty & Farley*
ATTORNEYS

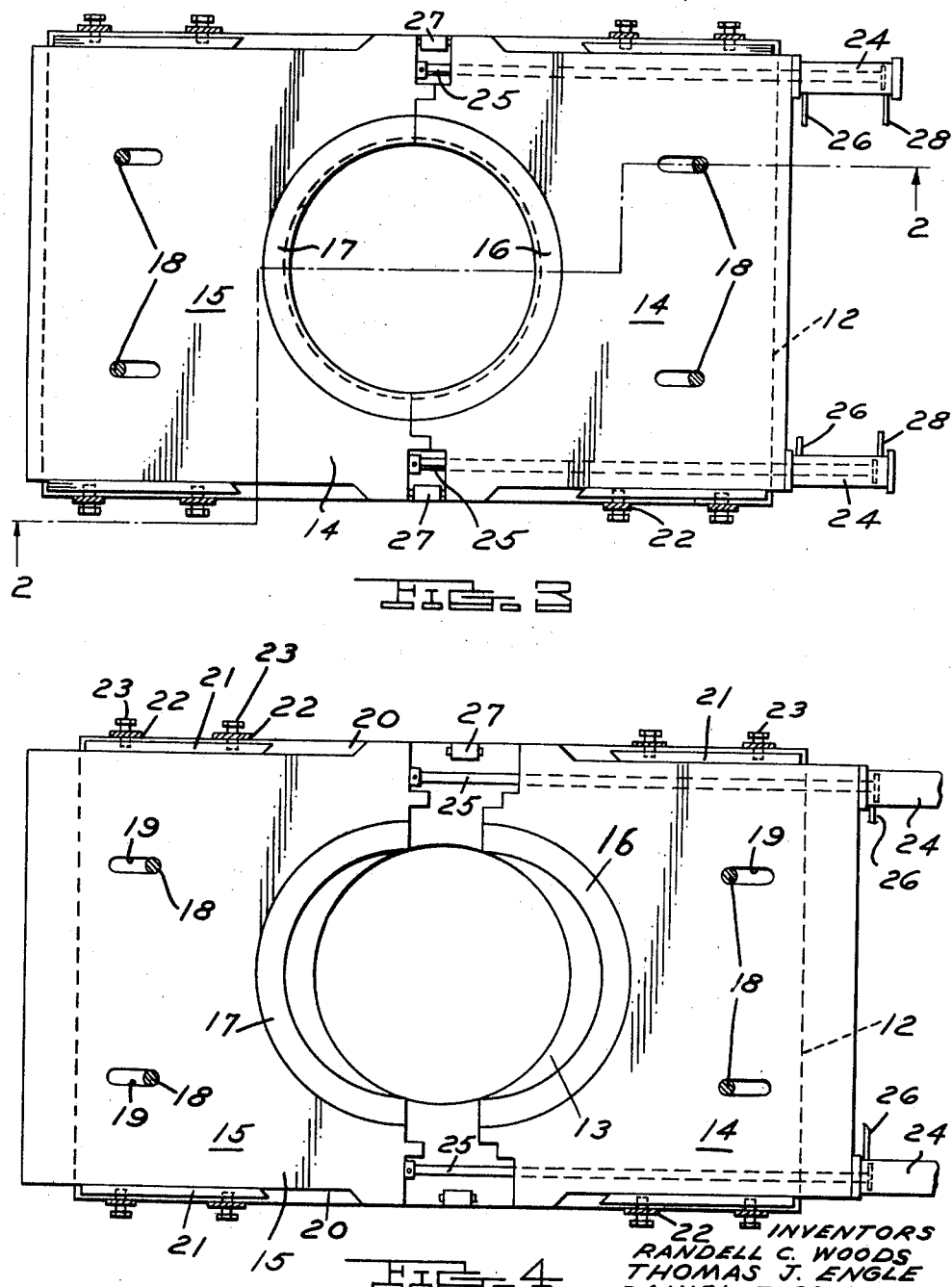

Patent 3,494,009

3,494,009
CONCRETE PIPE SEAL GROOVE FORMING MECHANISM

Randell C. Woods, Dearborn, Thomas J. Engle, Rockwood, Daniel J. Conley, Detroit, Ronald P. Kirchner, Dearborn, and Howard T. Rex, Franklin, Mich., assignors to Superior Products Company, Detroit, Mich., a corporation of Michigan
Original application June 17, 1964, Ser. No. 375,819, now Patent No. 3,305,908, dated Feb. 28, 1969. Divided and this application Dec. 19, 1966, Ser. No. 630,150
Int. Cl. B28b 1/00
U.S. Cl. 25—39                    2 Claims

ABSTRACT OF THE DISCLOSURE

This disclosure is directed to a pipe seal groove forming mechanism including a pair of support ring plates to support the exterior pipe wall, a pair of split ring reduced diameter, groove-forming plates interposed between said support ring plates, and means for slidably actuating said split-ring plates relative to said support ring plates between a groove forming position and a retracted position.

---

This is a division of application Ser. No. 375,819 filed June 17, 1964, now Patent No. 3,305,908, issued Feb. 28, 1967.

This invention relates to a device for forming seal grooves in the ends of concrete pipe which, as in the case of sewer pipe, may be required to accommodate gasket seals for engaging the bell-mouth end of adjacent pipe.

It has been customary practice in the forming of such grooves to employ clamped rings which are left assembled to the end of the pipe after forming and withdrawal of the pipe from the pipe mold until the pipe has set sufficiently to permit withdrawal of the rings without damage to the grooves. The placement and removal of such rings has been a time consuming process in the manufacture of concrete pipe and has required an expensive complement of groove rings for each pipe size which for typical production rates may cost in the order of $10,000 per set. The present groove forming mechanism adapted for use at the top or bottom end of a conventional concrete pipe forming mold has been developed to form satisfactory seal grooves at the same time that the main body of the pipe is formed and to completely eliminate the former requirement for a complement of rings to be left on the pipe upon withdrawal from the mold. The cost of the mechanism has been found to be approximately one-tenth the cost of a complement of rings and also to save the labor of two men per shift during normal production runs.

These and other objects of the invention will best be understood from the following detailed description of a preferred embodiment with reference to the drawings wherein:

FIG. 1 is a perspective view of the groove forming mechanism;

FIG. 2 is a partially sectioned side elevation thereof taken along the line 2—2 of FIG. 3;

FIG. 3 is a sectional plan view taken along the line 3—3 of FIG. 2 showing the groove forming mechanism in closed position;

FIG. 4 is a similar view showing the mechanism in open position.

The main elements of the mechanism include an upper solid plate 10 having an insert wear-resistant ring 11, a lower solid plate 12 having an insert wear-resistant ring 13, a pair of intermediate slidable plates 14 and 15 having groove forming split-ring insert elements 16 and 17 mounted therein. Four tie bolts 18 connect the upper and lower plates, passing through elongated slots 19 in the intermediate plates 14 and 15. The intermediate plates are recessed at their sides 20 to engage adjustable guide shoes 21 positioned from straps 22, welded to the upper and lower plates, by adjustment screws 23. A pair of hydraulic cylinders 24 mounted on the end of the intermediate plate 14 each has a piston rod 25 extending through the intermediate plate 14 anchored to the intermediate plate 15. The lower plate 12 registers against the top end of a conventional pipe mold 32 which may be indexed by means not shown to a pipe-forming position under the groove forming mechanism which is in turn movable vertically by means not shown after the forming operation.

Hydraulic pressure applied to lines 26 tensions the piston rods urging the intermediate plates 14 and 15 toward each other and against adjustable positive stops 27 anchored to the respective upper and lower plates 10 and 12 and positioning the respective ends of the semicircular groove forming rings 16 and 17 in abutting relation. Hydraulic pressure in lines 28 places the piston rods 25 under compression forcing the intermediate plates 14 and 15 apart to the position shown in FIG. 4 as limited by engagement of the tie bolts 18 with the inner ends of the elongated slots 19.

It will be understood that when this groove forming mechanism is positioned at the end of a pipe mold 32 with the intermediate plates 14 and 15 in the position shown in FIGS. 2 and 3 while the pipe 30 is formed by conventional means, a seal groove 31 will be formed therein by the groove forming ring elements 16 and 17 and that when the hydraulic cylinders 34 are actuated to retract the intermediate plates 14 and 15, the rings 11 and 13 associated with the upper and lower plates 10 and 12 will support the pipe end on either side of the groove 31 so that the groove forming elements 16 and 17 may be retracted immediately upon forming the pipe without waiting for any preliminary setting and without damage to the walls of the seal groove. Likewise, with the intermediate pipes in the open position shown in FIG. 4 axial separation of the pipe end from the groove forming mechanism may take place without damage to the pipe end or seal groove. With the respect plates in close fitting relationship as shown, abrasive wear from the concrete pipe materials will be substantially limited to the wear-resistant rings which may be replaced from time to time as required.

While a specific preferred embodiment of the present invention has been shown and described above in detail it will be understood that numerous other modifications might be resorted to without departing from the scope of the invention as defined in the following claims.

We claim:
1. A pipe seal groove forming mechanism comprising a pair of support ring plates having internal surfaces adapted to support the exterior pipe wall during the actuation of said mechanism, a pair of split ring reduced diameter, groove-forming plates interposed between said support ring plates, and hydraulic pressure cylinder means for slidably actuating said split-ring plates relative to said support ring plates between a groove forming position and a retracted position, including a pair of hydraulic cylinders mounted on one of said intermediate plates having piston rods anchored to the other of said intermediate plates, and tie bolt means extending between said support ring plates passing through apertures in said intermediate plates adapted to limit the opening travel thereof.

2. A pipe seal groove forming mechanism comprising a pair of support ring plates having internal surfaces adapted to support the exterior pipe wall during the actuation of said mechanism, a pair of split ring reduced diameter, groove-forming plates interposed between said support ring plates, and hydraulic pressure cylinder means for slidably actuating said split-ring plates relative to said support ring plates between a groove forming position and a retracted position, including a pair of hydraulic cylinders mounted on one of said intermediate plates, having piston rods anchored to the other of said intermediate plates, tie bolt means extending between said support ring plates passing through apertures in said intermediate plates adapted to limit the opening travel thereof, and adjustable lateral guide means for controlling the relative position of said support ring and split-ring plates.

References Cited

UNITED STATES PATENTS

| | | | |
|---|---|---|---|
| 763,048 | 6/1904 | Davis | 25—39 X |
| 3,114,956 | 12/1963 | Gannaway | 25—39 |
| 3,161,936 | 12/1964 | Tilles | 25—39 |
| 3,201,844 | 8/1965 | Poitras | 25—39 |

FOREIGN PATENTS 659,877  10/1951  Great Britain.

J. SPENCER OVERHOLSER, Primary Examiner

R. D. BALDWIN, Assistant Examiner

U.S. Cl. X.R.

25—127; 249—98